United States Patent [19]
Ohsaki et al.

[11] Patent Number: 5,556,723
[45] Date of Patent: Sep. 17, 1996

[54] NEGATIVE ELECTRODE FOR USE IN A SECONDARY BATTERY

[75] Inventors: Takahisa Ohsaki; Norio Takami, both of Yokohama; Yoshiyuki Nishimura; Toshio Tamaki, both of Kamisu-machi, all of Japan

[73] Assignees: Kabushiki Kaisha Toshiba; Petoca, Ltd., both of Tokyo, Japan

[21] Appl. No.: 306,614

[22] Filed: Sep. 15, 1994

[30] Foreign Application Priority Data

Sep. 17, 1993 [JP] Japan ................................ 5-253627

[51] Int. Cl.⁶ ....................................................... H02M 4/58
[52] U.S. Cl. ...................... 429/218; 429/232; 423/447.1; 264/29.2
[58] Field of Search ..................... 429/232, 218; 423/447; 264/29.2

[56] References Cited

U.S. PATENT DOCUMENTS

| | | | |
|---|---|---|---|
| 4,894,355 | 1/1990 | Takeuchi et al. | 502/101 |
| 5,030,435 | 7/1991 | Kilamuna et al. | 423/447.4 |
| 5,224,757 | 7/1993 | Takami et al. | |
| 5,227,237 | 7/1993 | Saruyama et al. | 428/367 |
| 5,312,611 | 5/1994 | Takami et al. | |

FOREIGN PATENT DOCUMENTS

| | | |
|---|---|---|
| 0495613 | 7/1992 | European Pat. Off. |
| 0583062 | 2/1994 | European Pat. Off. |
| 4-61747 | 2/1992 | Japan |
| 4-196055 | 7/1992 | Japan |
| 4-184862 | 7/1992 | Japan |

OTHER PUBLICATIONS

Carbon, vol. 26, No. 4, pp. 565–571, 1988, Gen Katagiri, et al., "Raman Spectra of Graphite Edge Planes" (no month or date known).

Patent Abstracts of Japan, vol. 18, No. 12, (C–1150), Nov. 1, 1994, JP-A-5-247729, Sep. 24, 1993.

*Primary Examiner*—Prince Willis, Jr.
*Assistant Examiner*—Richard H. Lilley, Jr.
*Attorney, Agent, or Firm*—Oblon, Spivak, McClelland, Maier & Neustadt, P.C.

[57] ABSTRACT

A negative electrode for use in a secondary battery is disclosed, comprising milled carbon fibers derived from mesophase pitch wherein the milled carbon fibers each has a fiber cut surface and a fiber axis intersecting with each other at cross angles, the smaller one thereof being at least 65° on the average. This negative electrode does not suffer from property deterioration, irrespective of multiple repetitions of charge and discharge, from which a nonaqueous-electrolyte-loaded lithic secondary battery having excellent cycle characteristics can be fabricated.

2 Claims, 2 Drawing Sheets

NEGATIVE ELECTRODE FOR USE IN A SECONDARY BATTERY

FIELD OF THE INVENTION

The present invention relates to a negative electrode for use in a secondary battery. More particularly, the present invention is concerned with a negative electrode for use in a secondary battery, comprising specific milled carbon fibers, which can provide a lithium secondary battery with nonaqueous electrolytes having large charge and discharge capacities per weight and exhibiting excellent charge and discharge cycle characteristics.

BACKGROUND OF THE INVENTION

The secondary battery in which an alkali metal such as lithium is used as an active material of a negative electrode has generally various advantages. For example, it not only ensures high energy and high electromotive force, but also has wide operating temperature range due to the use of a nonaqueous electrolyte and is excellent in shelf life, miniaturized and lightweight.

Therefore, the practical use of the above lithium secondary battery with nonaqueous electrolytes is anticipated as a power source for use in a portable electronic appliance and also as a high-performance battery for use in an electric vehicle and electricity storage.

However, all the developed prototype batteries have not fully realized the above properties anticipated from the lithium secondary battery, and thus have been incomplete from the viewpoint of cycle life, charge and discharge capacities and energy density.

A major cause thereof resided in a negative electrode used in the secondary battery.

For example, a lithium secondary battery having a negative electrode composed of metal lithium incorporated therein has disadvantageously short cycle life and poor safety because lithium precipitated on the surface of the negative electrode during charging formed acicular dendrite is apt to cause short-circuit between the negative and positive electrodes.

Lithium has extremely high reactivity, thereby causing the electrolyte to suffer from decomposition reaction in the vicinity of the surface of the negative electrode. Thus, there was the danger that the above decomposition reaction would modify the surface of the negative electrode to thereby lower the cell capacity during repeated uses of the secondary battery.

Various studies have been made on the material of the negative electrode with a view toward obviating the above problems of the lithium secondary battery.

For example, the use of alloys containing lithium, such as lithium/aluminum and Wood's alloy, as the material of the negative electrode of the lithium secondary battery, has been studied. However, this negative electrode composed of such a lithium alloy had a problem of crystal structure change attributed to the difference in operating temperature and charge and discharge conditions.

Further, the use of graphite and other carbon materials as the material of the negative electrode of the lithium secondary battery, has been studied. For example, an attempt has been made to insert lithium ions formed during charging in spacing between graphite layers of the carbon material (intercalation) to thereby produce a compound known as "intercalation compound" for the purpose of preventing the formation of dendrite.

As such carbon materials, carbon fibers, especially carbon fibers derived from mesophase pitch, have been extensively studied and results superior to those of the conventional carbon materials have been reported. In this connection, reference is made to Japanese Patent Laid-Open Publication Nos. 4(1992)-61747, 4(1992)-184862 and 4(1992)-196055.

However, the carbon materials are various in the size and configuration of crystallites, the content of impurities, etc., depending on the type of the starting material and the manufacturing conditions. The process for producing the carbon material optimum for the formation of the electrode of the lithium secondary battery and the characteristics of the above carbon material, have not yet been specified, and the current situation is that no carbon material for use as a negative electrode which can satisfy all the demands on prolongation of the cycle life, increase of the charge and discharge capacities, etc. has been developed.

Various studies on the increase of the capacity of the secondary battery have been reported. However, there are few or no reports on the development directed to another key point, i.e., the cell volume or the energy efficiency per weight.

The development of a suitable casing and the improvement of the positive electrode and the electrolyte are inevitable for the decrease of the weight of the secondary battery. These are not sufficient, and the increase of the bulk density of the negative electrode is also an inevitable important matter.

The inventors have made extensive and intensive studies on the carbon material for use in the negative electrode which can prolong the cycle life of the secondary battery and can increase the charge and discharge capacities and the energy efficiency thereof. As a result, they have found that the configuration of the carbon material used in the negative electrode has striking impacts on not only the improvement of the cycle characteristics and charge and discharge capacities of the secondary battery having the above negative electrode incorporated therein but also the miniaturization of the secondary battery. The present invention has been completed on the basis of the above finding.

OBJECT OF THE INVENTION

The present invention has been made with a view toward obviating the above drawbacks of the prior art. Thus, the object of the present invention is to provide a negative electrode for use in a secondary battery, which has a high bulk density and which is suitable for providing a lithium secondary battery being miniaturized, having large charge and discharge capacities and exhibiting excellent cycle characteristics.

SUMMARY OF THE INVENTION

The negative electrode for use in a secondary battery according to the present invention comprises milled carbon fibers derived from mesophase pitch wherein each of the milled carbon fibers has a fiber cut surface and a fiber axis intersecting with each other at cross angles, the smaller one thereof being at least 65° on the average.

In the negative electrode for use in a secondary battery according to the present invention, it is preferred that the milled carbon fibers derived from mesophase pitch have an aspect ratio (ratio of the length to the diameter of the carbon fiber) ranging from 1 to 20 and a fiber diameter variation coefficient ranging from 10 to 50%, from the viewpoint that a high bulk density can be realized.

Further, the negative electrode for use in a secondary battery according to the present invention can have improved charge and discharge efficiency when the milled carbon fibers derived from mesophase pitch have a content of elements other than carbon which is limited to not greater than 3000 ppm.

DETAILED DESCRIPTION OF THE INVENTION

The negative electrode for use in a secondary battery according to the present invention will now be illustrated.

The negative electrode for use in a secondary battery according to the present invention comprises milled mesophase-based carbon fibers.

The pitch as the starting material of the mesophase-based carbon fiber for use in the present invention is optically anisotropic pitch, i.e., mesophase pitch. The mesophase pitch can generally be prepared from oil, coke and other various raw materials. The starting material of the carbon fiber for use in the present invention is not particularly limited as long as it is spinnable.

The desired mesophase-based carbon fiber produced by subjecting the above starting pitch to spinning, infusibilization and carbonization or graphitization according to the customary procedure permits free control of the crystallization degree thereof, so that it is suitable for use in the preparation of a negative electrode of a secondary battery.

The terminology "milled carbon fiber" used herein means a carbon fiber having a length of not greater than 1 mm, as different from a chopped strand carbon fiber having a length of, for example, 1 to 25 mm.

The milled carbon fiber to be employed in the present invention has a fiber cut surface and a fiber axis intersecting with each other at cross angles, the smaller one thereof being at least 65°, preferably at least 70°, still preferably at least 75° on the average.

Figure 3:
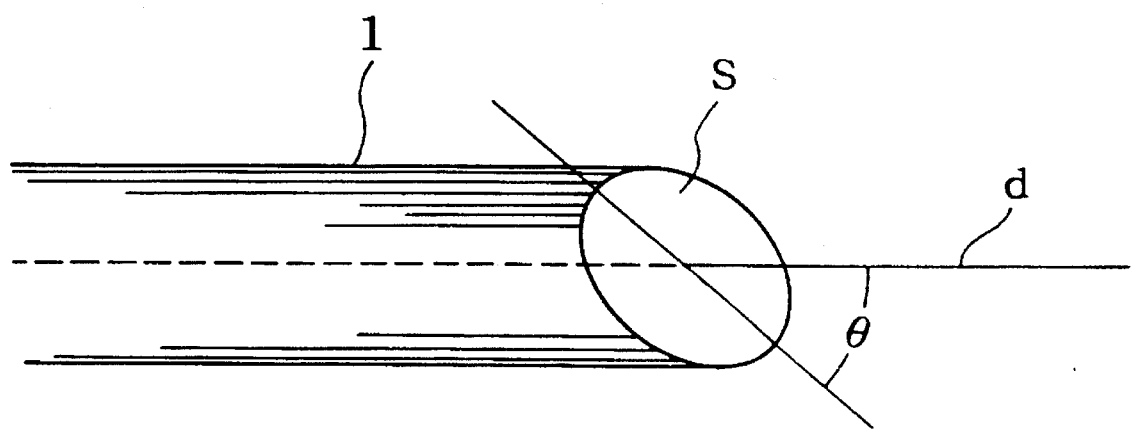
FIG. 3 is a schematic perspective of the milled carbon fiber provided for explaining the cross angle of a fiber cut surface and a fiber axis intersecting with each other.

The cross angle of the fiber cut surface and the fiber axis intersecting with each other will be illustrated below with reference to FIG. 3. FIG. 3 is a schematic perspective of an end portion of the milled carbon fiber provided for explaining the cross angle of the fiber cut surface and the fiber axis of the carbon fiber intersecting with each other. As illustrated, the carbon fiber 1 has a fiber cut surface (s) formed by the milling at an end portion thereof. In the present invention, the smaller angle ($\theta$), on the average, of the cross angles of the fiber cut surface (s) and the fiber axis (d) of the carbon fiber 1 intersecting with each other is defined as the above value for numerical limitation.

Herein, the average of the cross angle ($\theta$) is an average of the cross angles of at least 100 milled carbon fibers. In the calculation of the average of the cross angle ($\theta$), when the carbon fiber has suffered from longitudinal crack along the fiber axis (d) on the fiber cut surface during milling, the cross angle ($\theta$) is defined to be 0°. The average of the cross angle ($\theta$) of the fiber cut surface (s) and the fiber axis (d) intersecting with each other can be measured by the use of a scanning electron microscope (SEM).

Figure 2:
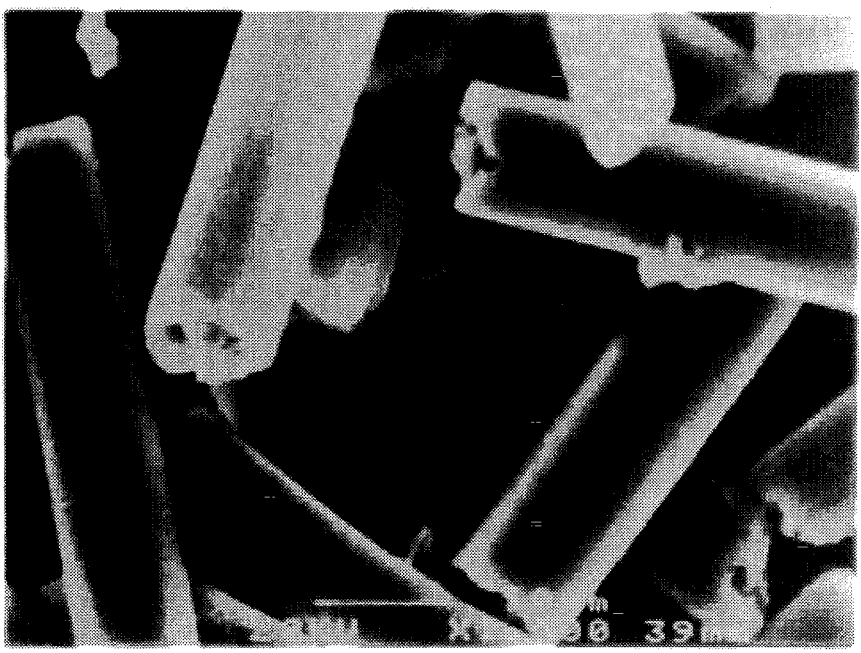
FIG. 2 is a scanning electron micrograph of the milled carbon fiber to be employed in the present invention.

The milled carbon fiber having at least 65° of an average cross angle ($\theta$) of the fiber cut surface (s) and the fiber axis (d) intersecting with each other is cylindrical in the entire configuration thereof and has no sharply projecting portion such as acicular portion from the fiber cut surface, as shown in FIG. 2 which is an SEM micrograph of the milled carbon fiber to be employed in the present invention. That is, it is important in the present invention to employ the milled carbon fiber which is cylindrical and which has a fiber cut surface nearly perpendicular to a graphite layer plane.

Figure 1:
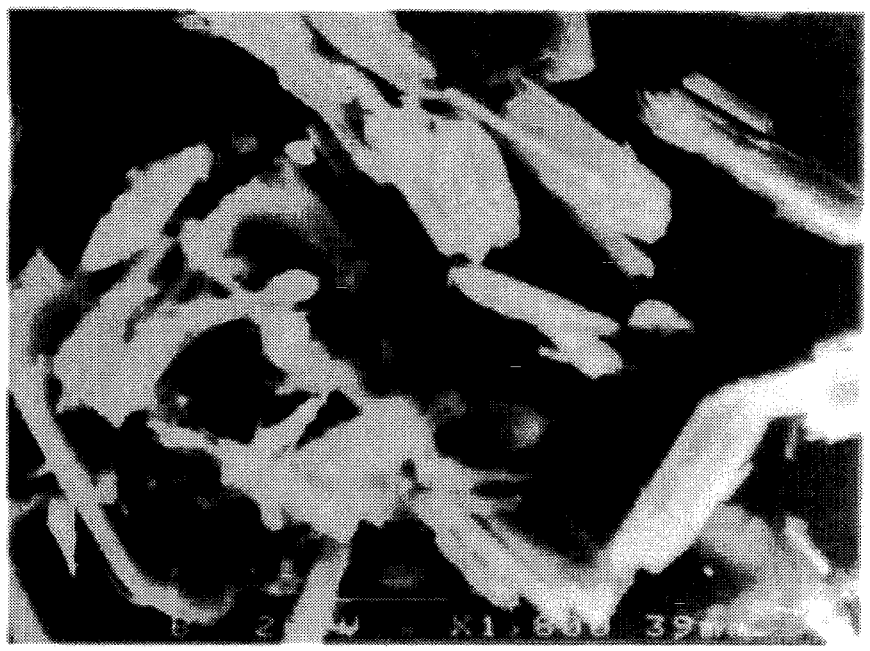
FIG. 1 is a scanning electron micrograph of the conventional milled carbon fiber.

In the carbon fiber, a graphite layer plane is formed nearly along the fiber axis thereof. The inventors' study and observation have revealed that the angle of the cutting of the carbon fiber becomes nearly parallel to the fiber axis, depending on the force applied to the carbon fiber during milling, so that the carbon fiber is cleaved along the graphite layer plane to thereby expose much of sharply uneven graphite layer plane and, in extreme cases, to render the fiber acicular, as shown in FIG. 1 being an SEM micrograph of the conventional milled carbon fiber. The average of the above cross angle ($\theta$) of these milled carbon fibers is less than 65°.

When a negative electrode is prepared from the above milled carbon fiber which is extremely marked in the area of exposure of the graphite layer plane having originally been present inside the carbon fiber, the above exposure resulting from the frequent cleavages along the fiber axis and along the graphite layer plane during milling, that is, when a negative electrode is prepared from the milled carbon fiber whose average of the cross angle ($\theta$) is less than 65°, the secondary battery assembled using the negative electrode suffers from extreme cycle deterioration. The reason would be that, when charge and discharge are repeated with the use of the thus assembled lithium secondary battery, electrons are localized at protrudent edges of the sharply uneven graphite layer plane during the charging to thereby effect decomposition or reduction polymerization of the electrolyte in the vicinity of the graphite layer plane with the result that a nonconductor film or the like is formed on the surface of the negative electrode, thereby deteriorating cycle characteristics.

The milled carbon fiber for use in the present invention may be produced by spinning mesophase pitch as the starting material, infusibilizing the spun fiber and milling the infusibilized fiber.

It is preferred from the viewpoint of efficiently obtaining the carbon fiber suitable for use in the present invention that the milling be performed by a procedure comprising revolving a rotor equipped with a blade at a high speed and contacting the fiber with the blade to thereby cut the fiber in the direction perpendicular to the fiber axis. In this procedure, the milling may be performed by the use of, for example, the Victory mill, jet mill or cross flow mill. In the above procedure, the length of the milled carbon fiber can be controlled by regulating the rotating speed of the rotor, the angle of the blade, the size of porosity of a filter attached to the periphery of the rotor, etc.

In the prior art, the milling of the carbon fiber has also been performed by means of the Henschel mixer, ball mill or mixing machine. This milling cannot be stated to be an appropriate procedure because not only does pressure apply to the carbon fiber in the direction of the diameter thereof to thereby increase the probability of longitudinal cracks along the fiber axis but also the milling takes a prolonged period of time.

In the process for producing the milled carbon fiber for use in the present invention, primary heat treatment (light carbonization) of the infusibilized pitch fiber in an inert gas at temperatures ranging from 250° C. to 1500° C. may precede the milling. The primary heat treatment and milling may be followed by secondary heat treatment at 1500° to 3100° C. The heat treatments are effective in preventing the longitudinal cracks of fiber by milling and in promoting the polycondensation and cyclization reaction on the graphite layer plane having been newly exposed during milling at the time of the higher-temperature secondary heat treatment to thereby lower the activity of the surface, so that the decomposition of the electrolyte is suppressed.

Conducting heat treatment (carbonization or graphitization) in an inert gas at 1500° C. or higher and thereafter milling is not desirable because not only are cracks likely to occur along the graphite layer plane having grown along the fiber axis but also the proportion of broken surface area to the total milled surface area of the produced carbon fiber is likely to increase to thereby promote the localization of electrons on the broken graphite layer plane and thus the decomposition of the electrolyte.

It is preferred in the present invention to employ milled carbon fibers having an aspect ratio ranging from 1 to 20, especially from 1 to 10 and a fiber diameter variation coefficient ranging from 10 to 50%, especially from 15 to 40%. The employment of the above milled carbon fiber leads to the realization of a higher bulk density of the resultant negative electrode for use in a secondary battery.

Herein, each of the above aspect ratio and fiber diameter variation coefficient is an average of the values of at least 100 samples taken from the obtained milled carbon fibers.

The conventional use of the milled carbon fiber has been in the mixing into plastics to thereby accomplish not only the reduction of the weight and the increase of the rigidity thereof but also the improvement of the conductivity and wear resistance of the plastics. Thus, the conventional milled carbon fiber generally has a length of at least 200 μm and a relatively high aspect ratio.

With respect to the fiber diameter variation coefficient, the main target has been in lowering it in order to render uniform the weight per area of a prepreg or woven fabric comprising the milled carbon fiber.

Apart from the above viewpoint, the inventors have studied the configuration of the fiber which leads to the prolongation of the cycle life, the increase of the charge and discharge capacities and the improvement of the energy efficiency of the secondary battery when the milled carbon fiber has been employed as a material of a negative electrode of a secondary battery. As a result, they have found that controlling is desired for increasing the fiber diameter variation coefficient and lowering the aspect ratio as compared with the values having generally been adopted in the prior art.

That is, when the aspect ratio exceeds 20 or when the fiber diameter variation coefficient is less than 10%, interstices are likely to be unfavorably formed between fibers to thereby render the increase of the bulk density of the negative electrode unattainable and further to cause the conductivity thereof to be poor.

Moreover, when the aspect ratio of the employed milled carbon fibers exceeds 20 and becomes too large, that is, when the employed milled carbon fibers have an extremely large fiber length, short circuiting is unfavorably likely to occur between the negative and positive electrodes besides the difficulty in increasing the bulk density of the negative electrode.

The employment of milled carbon fibers having a fiber diameter variation coefficient exceeding 50% involves the mixing of carbon fibers having too large fiber diameters, so that, unfavorably, the flatness of the electrode surface may be decreased, or the pressure applied during roll shaping may be focused on the above too large carbon fibers to thereby bring about the danger of longitudinal fiber cracks.

When the aspect ratio is less than 1, the number of carbon fibers suffering from longitudinal cracks along the fiber axis is likely to be unfavorably increased during milling.

In the production of a mass of milled carbon fibers having a fiber diameter variation coefficient of 10 to 50%, it is advantageous to spin pitch into pitch fibers through a spinning nozzle having a plurality of spinning orifices with different diameters per nozzle.

Alternatively, it is feasible to first produce a plurality of pitch fibers with different diameters and then performing either appropriate blending followed by milling or milling followed by blending.

The pitch fiber may be spun by any of the conventional melt, centrifugal, vortex and other spinning techniques. Especially, the melt blow spinning technique is preferred, collectively taking into account the production costs including spinning apparatus construction and operating costs and the quality control including the degree of freedom in controlling fiber diameters.

The pitch fiber for use in the present invention may be spun by blowing to breakage a pitch having a viscosity as low as several to several tens of poises (it has been believed that spinning is difficult at this level of viscosity) to obtain short fibers according to the melt blow technique.

In the above spinning, a new fiber discharge being delivered from the nozzle immediately has a thick tip and is gradually drawn by the action of hot gas to have diameters decreasing to fiber breakage. These are repeated until the spinning is completed.

That is, fibers each with a taper configuration having a gradually decreasing diamter from a thick tip to the other tip are obtained. The configuration can be controlled by regulating the viscosity of the pitch as the raw material, the flow rate of hot gas and the rate of discharge of the raw material.

Therefore, fibers each having diameters varying along the longitudinal direction can be obtained, so that the starting material for the milled carbon fibers having an appropriate fiber diameter variation coefficient can be produced without the need of the use of a special nozzle and without the need of blending after milling.

The configuration of the milled carbon fiber for use in the present invention and the process for producing the carbon fiber with the above configuration have been described. Now, the desired purity and crystal structure of the milled carbon fiber will be described.

The carbon material generally contains compounds of elements other than carbon, such as nitrogen, oxyen, sulfur, halogens and metals, e.g., iron, depending on the type of the starting material. The purity of the carbon material for use in the negative electrode affects the ratio of discharge capacity to charge capacity (hereinafter referred to as "charge and discharge efficiency") of a secondary battery, especially the initial charge and discharge efficiency.

The total content of such impurities in the milled carbon fiber for use in the present invention is generally not greater than 3000 ppm, preferably not greater than 2000 ppm, till preferably not greater than 1500 ppm. The above total content of impurities may be determined by the flame photometry, plasma fluorescence analysis, ion chromatography or the like.

Lithium is likely to react with any of the above compounds of elements other than carbon, thereby forming lithium compounds. In the lithium compounds, lithium cannot be present in the form of free lithium ions. That is, when a carbon material containing the above impurities in a concentration exceeding 3000 ppm is employed as the material of a negative electrode, the negative electrode may have an extremely low charge and discharge efficiency, especially an extremely low initial charge and discharge efficiency.

A treatment comprising reacting chlorine, etc. with the impurities during carbonization or graphitization and removing the impurities as halides from the system, namely high-purifying treatment is advantageously carried out for obtaining a purified carbon material whose impurity content is not greater than 3000 ppm.

In the production of the mesophase-based carbon fiber, it is preferred that a starting pitch material having the lowest possible impurity content be chosen, and that filtration and other treatments be performed to further reduce the impurity content.

With respect to the crystallite parameters in X-ray diffractometry of the milled carbon fiber for use in the present invention, it is preferred that the spacing of lattice planes ($d_{002}$) be 3.356 to 3.520 Å, that the size of crystallite along the c-axis (Lc) be 20 to 800 Å, and that the size of crystallite along the a-axis (La) be 15 to 1000 Å

The negative electrode for use in a secondary battery according to the present invention may be produced by adding a binder to the above-described milled carbon fiber and forming the binder-loaded carbon fiber by means of rolls into a shape suitable for use as a negative electrode. Examples of such binders include polyethylene and polytetrafluoroethylene.

The thus produced negative electrode for use in a secondary battery according to the present invention has a bulk density of generally at least 1.3 g/cm$^3$, preferably at least 1.4 g/cm$^3$ and still preferably at least 1.5 g/cm$^3$, so that it is suitable for miniaturization of a battery.

The negative electrode for use in a secondary battery according to the present invention may be used as it is upon the shaping when a salt containing a large amount of lithium is used as a positive electrode in the secondary battery. On the other hand, when the material of the positive electrode does not contain a large amount of lithium, the negative electrode is subjected to reduction treatment using metal lithium as a counter electrode for the negative electrode to thereby readily convert the same to a negative electrode of high performance.

The negative electrode for use in a secondary battery according to the present invention may be provided with a current collector as is the conventional battery electrode. The current collector for the negative electrode may be in the form of a plate, a foil or a rod composed of a conductor electrochemically inert to the electrode and the electrolyte, e.g., selected from metals such as copper, nickel, titanium and stainless steel. The above current collector may be applied to the positive electrode described later.

A lithium-ion secondary battery having the negative electrode for use in a secondary battery according to the present invention may be comprised of the negative electrode, a positive electrode and, interposed therebetween, a separator impregnated with an electrolyte.

The separator may be comprised of a nonwoven or woven fabric of synthetic or glass fibers, a polyolefinic porous membrane, a nonwoven fabric of polytetrafluoroethylene and other conventional material.

Although the type of the solvent for use in the electrolyte infiltrated in the separator is not particularly limited as long as it can dissolve lithium salts, it is preferred that the solvent be selected from aprotic organic solvents having high dielectric constants.

Examples of such solvents include propylene carbonate, ethylene carbonate, tetrahydrofuran, 2-methyltetrahydrofuran, dioxolan, 4-methyldioxolan, acetonitrile, dimethyl carbonate and diethyl carbonate. These solvents may be used either individually or in appropriate combination.

Lithium salts capable of forming stable anions may be suitably used as the electrolyte, which include, for example, lithium perchlorate, lithium borofluoride, lithium hexafluoroantimonate, lithium hexachloroantimonate and lithium hexafluorophosphate (LiPF$_6$).

Various compounds may be used as the positive electrode, which include, for example, metal lithium and metal oxides such as chromium oxide, titanium oxide and vanadium pentoxide; lithium metal oxides such as lithium manganese oxide (LiMn$_2$O$_4$), lithium cobalt oxide (LiCoO$_2$) and lithium nickel oxide (LiNiO$_2$); transition metal chalcogen compounds such as titanium sulfide and molybdenum sulfide; and conductive conjugated polymeric substances such as polyacetylene, polyparaphenylene and polypyrrole.

The negative electrode for use in a secondary battery according to the present invention is accommodated together with other battery constituting elements, such as the above-mentioned current collector, positive electrode and separator, and the electrolyte in a casing by the use of a gasket, a sealing plate, etc. according to the customary procedure. Thus, a cylindrical, rectangular or buttony lithium-ion secondary battery can be assembled.

EFFECT OF THE INVENTION

The negative electrode for use in a secondary battery according to the present invention comprises milled carbon fibers having a fiber cut surface and a fiber axis intersecting with each other at cross angles, the smaller one thereof being at least 65°, so that it does not suffer from property deterioration, irrespective of multiple repetitions of charge and discharge and can provide a lithium secondary battery with nonaqueous electrolytes having excellent cycle characteristics.

When the milled carbon fiber derived from mesophase pitch has an aspect ratio of 1 to 20, a fiber diameter variation coefficient of 10 to 50% and an impurity content of 3000 ppm or less, the negative electrode for use in a secondary battery according to the present invention has increased bulk density to thereby render the secondary battery compact and further improve the discharge capacity, especially the initial charge and discharge efficiency, of the secondary battery.

EXAMPLES

The present invention will further be illustrated with reference to the following Examples, which should not be construed as limiting the scope of the invention. The properties of the milled carbon fibers produced in Examples 1 to 4 and Comparative Examples 1 and 2 and the discharge characteristics of the secondary batteries produced using an electrode made from the milled carbon fibers are summarized in Table 1.

Example 1

A starting material of optically anisotropic petroleum mesophase pitch having a softening point of 280° C. was melted and drawn through a nozzle comprising a 3 mm wide slit and, arranged therein, a line of 1500 spinning orifices each having a diameter of 0.2 mm while injecting hot air through the slit, thereby obtaining pitch fibers. The spinning was conducted at a pitch discharge rate of 1500 g/min, a pitch temperature of 340° C., a hot air temperature of 350° C. and a hot air pressure of 0.2 kg/cm$^2$G. The viscosity of the pitch melt was 12 poises.

The spun pitch fibers were collected on a belt having a collection zone of 20-mesh stainless steel net while sucking fiber carrying air from the back of the belt.

The resultant collected fiber mat was heat treated in an air while elevating a temperature from room temperature to 300° C. at an average heat-up rate of 6° C./min to thereby infusibilize the fiber mat.

The thus obtained infusibilized mesophase-pitch-derived carbon fibers were milled with the use of a cross flow mill to obtain fibers having an average length of 50 μm, followed by graphitizing at 2650° C. in argon.

An SEM observation of the thus obtained graphitized milled carbon fibers showed that the average of the cross angle of the fiber cut surface and the fiber axis intersecting with each other was 85°, the average diameter was 12 μm, the aspect ratio was 4 and the fiber diameter variation coefficient was 23%.

The total content of impurities in the milled fibers was 1850 ppm.

5 g of the powdery graphitized milled fibers were mixed with 0.25 g of powdery polytetrafluoroethylene and kneaded. 40 mg of the resultant mixture was molded under a pressure of 3 t/cm$^2$ to obtain a 0.5 mm thick pellet.

The bulk density of the pellet was 1.58 g/cm$^3$.

This pellet as a negative electrode, metal lithium as a positive electrode and an electrolytic solution obtained by dissolving lithium hexafluorophosphate (LiPF$_6$) as an electrolyte in a 1:1 mixed carbonic ester solvent of ethylene carbonate (EC) and dimethyl carbonate (DMC) in a concentration of 1M, were assembled into a cell, and the charge and discharge capacity characteristics thereof were measured.

The measurement was made while conducting charge and discharge at a constant current of 200 mA/g. The discharge capacity was defined as the capacity until the cell voltage fell to 2 V.

Charge and discharge were repeated 50 times, and the measurement results showed that the initial discharge capacity and charge and discharge efficiency were 280 mAh/g and 93.3%, respectively, while the second discharge capacity and charge and discharge efficiency were 280 mAh/g and 100%, respectively.

Thereafter, the above negative electrode, lithium cobalt oxide (LiCoO$_2$) as a positive electrode and an electrolytic solution obtained by dissolving lithium hexafluorophosphate (LiPF$_6$) as an electrolyte in a 1:1 mixed carbonic ester solvent of ethylene carbonate and dimethyl carbonate in a concentration of 1M, were assembled into a lithium-ion secondary battery.

This secondary battery exhibited an average operating voltage of 3.7 V.

Example 2

Infusibilized mesophase-pitch-derived fibers obtained in the same manner as in Example 1 were carbonized at 1000° C., and milled to thereby obtain milled carbon fibers having an average fiber length of 110 μm, and the milled carbon fibers were graphitized at 2650° C.

The thus obtained graphitized milled carbon fibers had an average diameter of 6 μm, an aspect ratio of 17 and a fiber diameter variation coefficient of 43%.

The impurity content and the average cross angle of the graphitized milled fibers were 4200 ppm and 87°, respectively.

The powdery graphitized milled carbon fibers were molded into a pellet having a bulk density of 1.45 g/cm$^3$, and the charge and discharge characteristics were measured in the same manner as in Example 1.

The measurement results showed that the initial discharge capacity and charge and discharge efficiency were 265 mAh/g and 89.5%, respectively, while the second and subsequent discharge capacity and charge and discharge efficiency were 255 mAh/g or above and 97% or above, respectively.

Examples 3 and 4

Milled carbon fibers with the configurations specified in Table 1 were produced and pelletized, and the charge and discharge characteristics were measured, in the same manner as in Example 1.

The pellets had high bulk densities, and the charge and discharge characteristics were excellent.

Example 5

Infusibilized mesophase-pitch-derived fibers obtained in the same manner as in Example 1 were subjected to a primary heat-treatment at 1300° C., and milled to obtain milled carbon fibers having an average fiber length of 50 μm. The milled carbon fibers were graphitized at 2650° C. to obtain graphitized milled carbon fibers having an average diameter of 8 μm, an aspect ratio of 5, a fiber diameter variation coefficient of 11%, the average cross angle of 67° and an impurity content of 860 ppm. Using the graphitized milled carbon fibers, a pellet having a bulk density of 1.51 g/cm$^3$ was produced in the same manner as in Example 1 and measured in the charge and discharge characteristics. The measurement results showed that the initial discharge capacity and charge and discharge efficiency were 262 mAh/g and 90.5%.

Comparative Example 1

Spinning was performed at a melt viscosity of 85 poises, and the fibers were infusibilized and milled, in the same manner as in Example 1.

Subsequently, graphitization was conducted at 2650° C., thereby obtaining graphitized milled carbon fibers having a diameter of 12 μm, an aspect ratio of 23 and a fiber diameter variation coefficient of 12%.

An SEM observation of the milled carbon fibers showed many milled fibers with longitudinal cracks. The average cross angle and the impurity content of the milled carbon fibers were 58° and 930 ppm, respectively.

The powdery graphitized milled carbon fibers were molded into a pellet in the same manner as in Example 1. The bulk density of the pellet was as low as 1.15 g/cm$^3$.

Using the pellet, the charge and discharge characteristics were measured. The measurement results showed that the initial discharge capacity and charge and discharge efficiency were 275 mAh/g and 91.75%, respectively, to thereby ensure high performance comparable to those of Examples 1 and 2.

However, repetitions of charge and discharge caused the discharge capacity to gradually lower. The 50th discharge capacity was as small as 70 mAh/g, indicating poor practicability.

Comparative Example 2

Graphitized milled carbon fibers having the configuration and impurity content specified in Table 1 were produced, and pelletized in the same manner as in Example 1.

The bulk density of the pellet was low, and the initial charge and discharge efficiency was as low as 75%.

TABLE 1

|  | Ex. 1 | Ex. 2 | Ex. 3 | Ex. 4 | Ex. 5 | Comp. Ex. 1 | Comp. Ex. 2 |
|---|---|---|---|---|---|---|---|
| Cross angle (°) | 85 | 87 | 82 | 78 | 67 | 58 | 78 |
| Aspect ratio | 4 | 17 | 9 | 25 | 5 | 23 | 0.8 |
| Fiber diameter (μm) | 12 | 6 | 15 | 3 | 8 | 12 | 16 |
| Fiber diameter variation coefficient (%) | 23 | 43 | 8 | 47 | 11 | 12 | 6 |
| Impurity content (ppm) | 1850 | 4200 | 2060 | 380 | 860 | 930 | 5300 |
| Bulk density of pellets (g/cm$^3$) | 1.58 | 1.45 | 1.43 | 1.41 | 1.51 | 1.15 | 1.23 |
| Discharge characteristics |  |  |  |  |  |  |  |
| Initial discharge capacity (mAh/g) | 280 | 265 | 280 | 283 | 262 | 275 | 218 |
| Initial charge and discharge efficiency (%) | 93.3 | 89.5 | 93.3 | 96.5 | 90.5 | 91.7 | 75.3 |
| 50th discharge capacity (mAh/g) | 280 | 255 | 279 | 279 | 253 | 70 | 202 |
| 50th discharge and discharge efficiency | 100 | 100 | 99.3 | 99.8 | 100 | 92.5 | 95.3 |

What is claimed is:

1. A negative electrode for use in a secondary battery, comprising milled carbon fibers derived from mesophase pitch wherein the milled carbon fibers each has a fiber cut surface and a fiber axis intersecting with each other at cross angles, the smaller one thereof being at least 65° on the average, and has an aspect ratio (ratio of the length to the diameter of the carbon fiber) ranging from 1 to 20 and a fiber diameter variation coefficient ranging from 10 to 50%.

2. The negative electrode as claimed in claim 1, wherein the milled carbon fibers contain impurities comprising one or more compounds of elements other than carbon selected from the group consisting of nitrogen, oxygen, sulfur, halogens and metals, in an amount not greater than 3,000 ppm.

* * * * *